Figure 1:
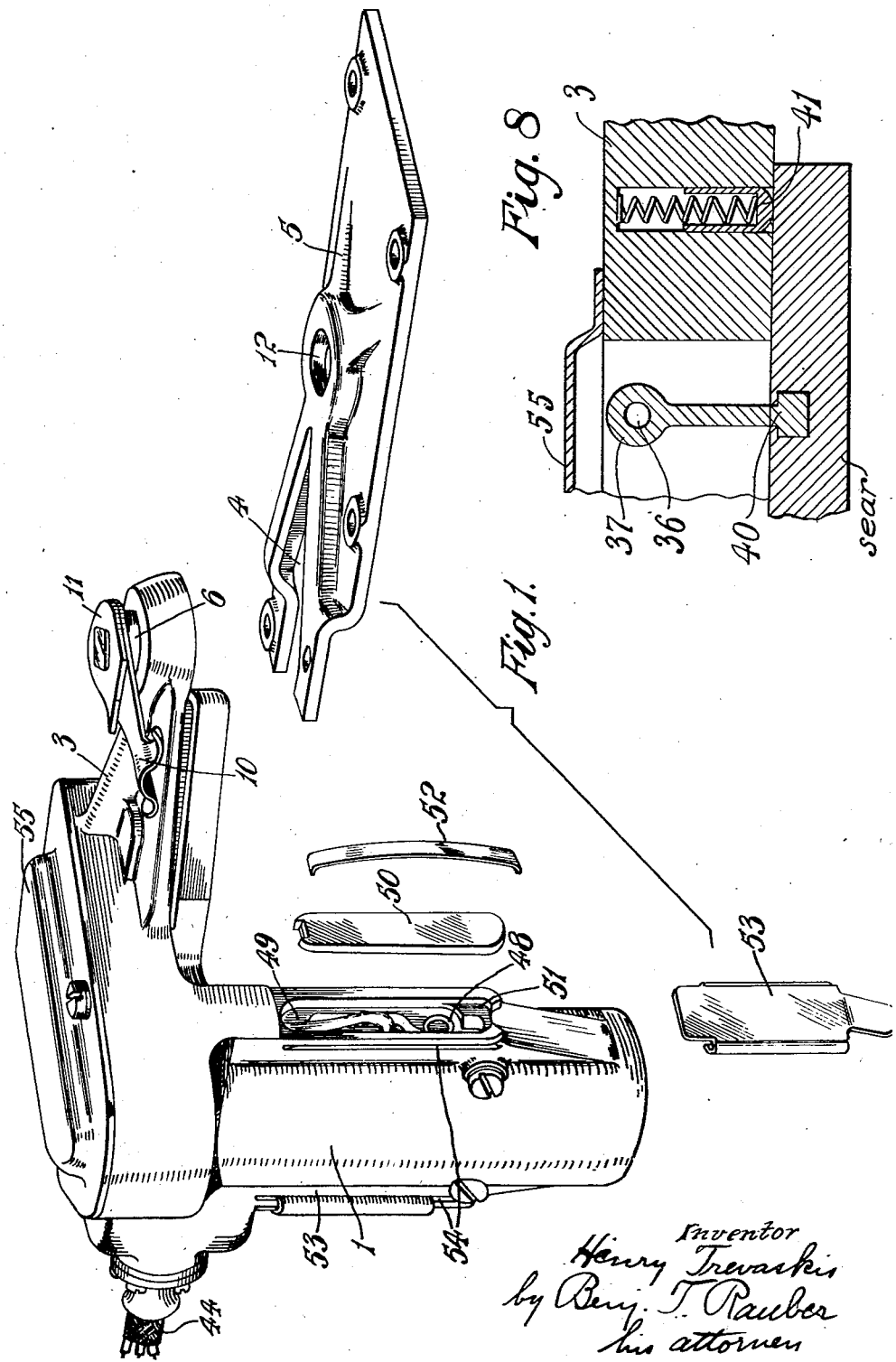

Aug. 14, 1945.   H. TREVASKIS   2,382,352
METHOD AND APPARATUS FOR CONTROLLING THE OPERATION
OF AUTOMATIC MECHANISM SUCH AS AUTOMATIC GUNS
Filed June 12, 1942   4 Sheets-Sheet 1

Aug. 14, 1945.   H. TREVASKIS   2,382,352
METHOD AND APPARATUS FOR CONTROLLING THE OPERATION
OF AUTOMATIC MECHANISM SUCH AS AUTOMATIC GUNS
Filed June 12, 1942   4 Sheets-Sheet 3

Inventor
Henry Trevaskis

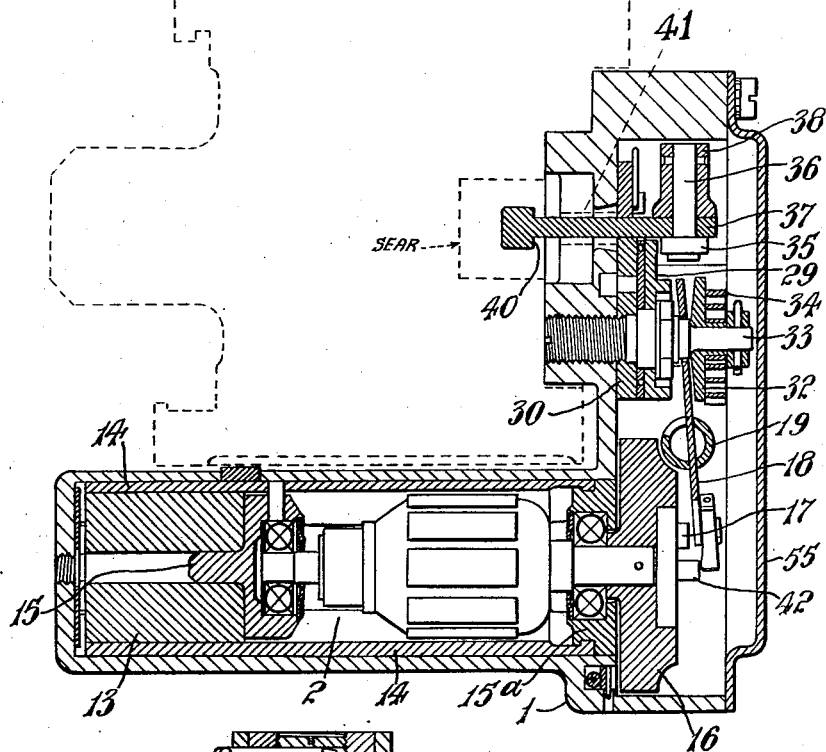
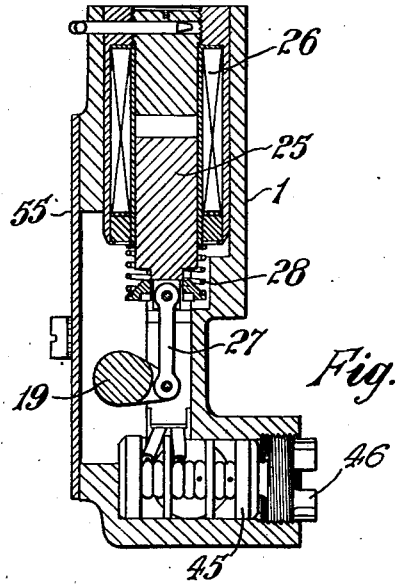

Patented Aug. 14, 1945

2,382,352

UNITED STATES PATENT OFFICE 2,382,352

METHOD AND APPARATUS FOR CONTROLLING THE OPERATION OF AUTOMATIC MECHANISM SUCH AS AUTOMATIC GUNS

Henry Trevaskis, Solihull, England, assignor to Dunlop Rubber Company Limited, London County, England, a British company Application June 12, 1942, Serial No. 446,832
In Great Britain April 18, 1941

11 Claims. (Cl. 89—28)

My invention concerns an improved method and apparatus for controlling the remote operation of automatic mechanism, as for example the firing of automatic guns on aircraft and has for its purpose to enable such guns to be fired or the apparatus to be operated from a remote control such as a firing button or switch by apparatus including devices operable wholly by electrical means and which may be mounted directly on the gun for operation by electrical connections extending from each gun or guns to the firing button.

According to this invention I provide a method of controlling the operation of apparatus, wherein said operation is effected or controlled by the release of kinetic energy from a continuously rotating body.

The kinetic energy may be derived from a continuously rotating body conveniently provided in the form of a small electric motor having a flywheel which stores energy to be used for instance for releasing the sear of the gun.

Said energy may be transmitted from the flywheel to the sear of the gun through a member such as an operating lever pivoted between its ends, one end of such lever making operative contact with suitable sear release mechanism of the gun, while the other end is displaceable into contact with the flywheel or a part associated therewith.

To ensure that the kinetic energy stored in the flywheel is used to the best effect, a timing device may be provided so that the operating lever can be moved fully into the path of a striking pin projecting from the flywheel when the pin is at such angular displacement from the lever that the pin has a predetermined minimum travel before it strikes the lever.

For this purpose the operating lever coacts with a gate or locking device movable into or out of the operative or locking position by means of a solenoid energised from the electric circuit which includes the gun firing button or switch.

The gate or locking device may be formed to retain the operating lever in the locked or firing position throughout the whole time the gun firing button is depressed, the motor continuing to rotate freely.

When the firing button or switch is released the solenoid is de-energised and the gate or locking device and the operating lever return to their initial position whereupon the sear of the gun is moved to restrain the breech block and the gun ceases to fire.

Figure 2:
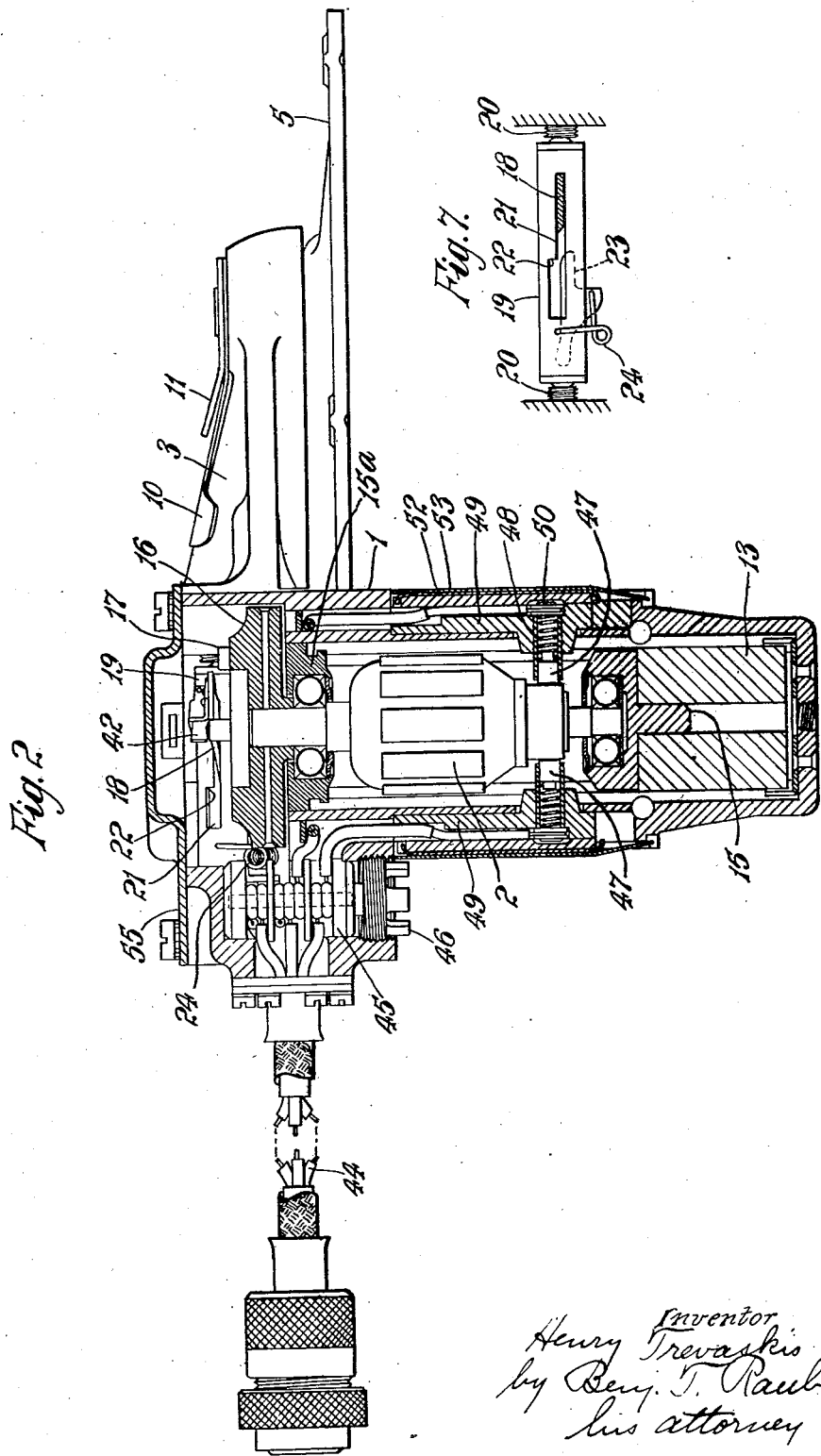
Figure 3:
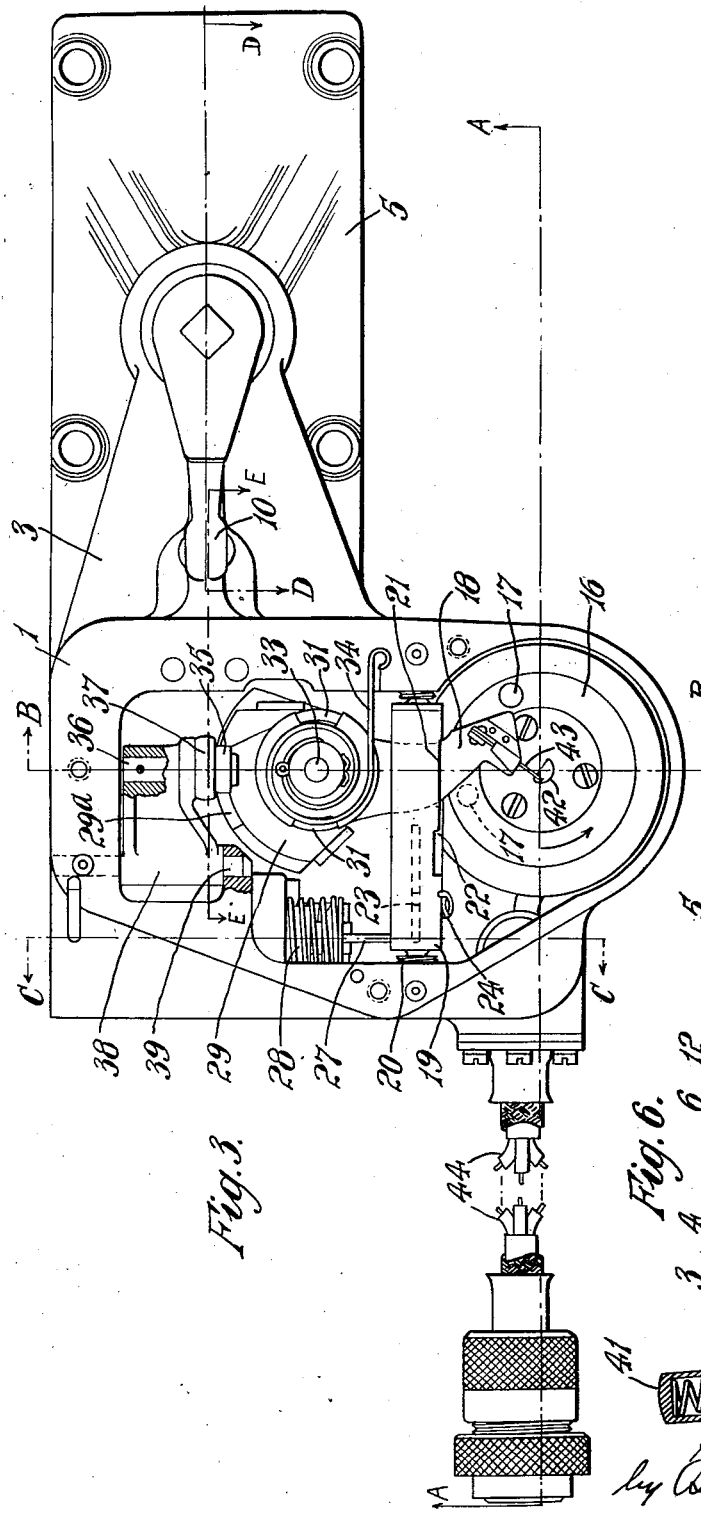
Figure 6:
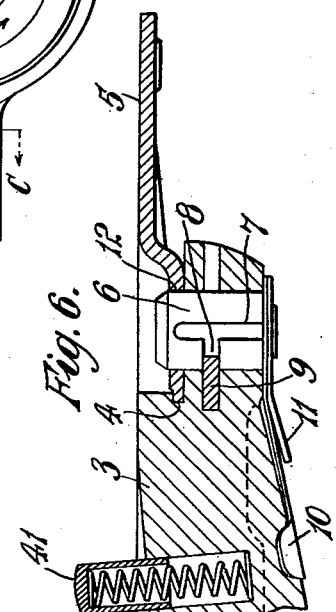

The various features of my invention are illustrated by way of example in the accompanying drawing in which:

Fig. 1 is a perspective view of a gun firing unit constructed according to my invention, and shows the unit separated from a mounting plate which is attachable to the gun, parts of the unit being detached to show details of construction. Fig. 2 is a side elevation partly in central vertical section on the line A—A of Fig. 3. Fig. 3 is a plan view of the unit including base plate and with the lid removed to show the inside mechanism. Fig. 4 is a sectional end view on the line B—B of Fig. 3, and shows the unit fitted to the gun which is represented by dotted lines. Fig. 5 is a sectional elevation on the line C—C of Fig. 3. Fig. 6 is a part sectional elevation on the line D—D of Fig. 3. Fig. 7 is a fragmentary side elevation showing the gate mechanism hereinafter described. Fig. 8 is a sectional view taken on the line E—E of Fig. 3.

According to a convenient embodiment of my invention the unit comprises a cast body 1 formed with a generally cylindrical housing for an electric motor 2 and with a platform 3 shaped on the inside to form a V-shaped projection which is of T cross section and which slidably engages with a V shaped slot 4 in a base plate 5 which is bolted to the gun.

The unit is adapted to be fixed to the base plate by means of a quick release device comprising a pin 6 (Fig. 6) rotatably mounted in the outer end of the platform 3, the pin having a longitudinal groove 7 and a circumferential groove 8 which latter engages a peg 9 fixed to the platform 3.

A blade spring 10 is riveted to the top of the pin 6 and a bent strip 11 limits the free bending of the blade spring.

To detach the unit 1 from the plate 5 the blade spring 10 and strip 11 are moved through 90° from the position shown in Figs. 2, 3 and 6 into the position shown in Fig. 1 which brings the longitudinal slot 7 into line with the peg 9: the pin 6 can now be pulled outwardly within the limit of the slot 7 to thereby disengage the projecting end of the pin 6 from the hole 12 in the plate 5.

When the unit is fastened to the base plate the blade spring 10 clips over a web between the platform 3 and casing 1.

The general housing for the motor 2 is bored out to secure a permanent magnet 13 which is surrounded by two semi-cylindrical pole pieces 14 Figs. 2 and 4, and the permanent magnet is drilled to receive a central pin 15 on a housing for the lower ball bearing of the armature shaft.

The upper ball bearing is mounted in a housing ring 15a which is shaped to engage the pole pieces 14.

The armature shaft projects into a recess in the top of the main body of the unit and a flywheel 16 is suitably fixed to the end of the shaft for instance by means of a suitable peg.

The top face of the flywheel 16 has a projecting peg 17 rigidly fixed thereto which is adapted to be operatively associated with a lever 18 which is freely mounted on a spindle 33 fixed to the casing 1 whereby the lever can be tilted to be in the path of the peg 17 on the flywheel 16, or raised out of contact into the position shown in Fig. 4.

The means for tilting the lever 18 into or out of the path of the peg 17 comprise a tubular gate 19 mounted to rotate on trunnions at each end engaging screws 20 in the casing 1.

The gate has a longitudinal slot 21 on each of two diametrically opposite sides and the lever 18 passes through this slot, one of the slots being enlarged at one end to form a locking shoulder 22 Fig. 7.

The lever 18 is moved into engagement with the locking shoulder 22 by means of a catch piece 23 pivotally mounted inside the gate 19 and spring loaded by a torsion spring 24.

The gate 19 is partly rotated to tilt the lever by virtue of its connection to the core 25 of a solenoid 26 Fig. 5, the core 25 being connected to the gate by a link 27 shown also in Fig. 3.

A spring 28 normally returns the core 25 and gate 19 to the inoperative position in which the lever 18 is raised out of the path of the peg 17.

The lever 18 is non-rotatably connected to a cam 29 (Figs. 3 and 4) which is freely rotatable on the spindle 33, ball bearings being mounted between the under side of the cam and the face of a fixed plate 30 Fig. 4: the cam 29 has a pair of upstanding lugs 31 Fig. 3 which engage notches in the lever 18 and similar notches in a washer 32 fitted on the spindle 33, the washer having a projecting central portion of square shape to form an anchorage for a torsion spring 34, the opposite end of which is anchored to the case 1, the torsion spring serving to return the lever and cam to the inoperative position shown.

The cam 29 is formed with a cam surface 29a at its periphery and this cam surface contacts a roller 35 Figs. 3 and 4 freely mounted on a pin 36 which passes through the sear release pin or trigger 37.

The pin 36 is mounted in the free end of a lever 38 which is freely pivoted on a pin 39 fixed to the casing 1.

The trigger pin passes through a slot in the base of the casing 1 and is shaped to provide shoulders 40 which engage the sear of the gun shown diagrammatically in Fig. 4.

The trigger pin 37 is held in engagement with the sear by the spring loaded plunger 41 shown in broken lines in Fig. 4 which bears upon the sear at one side of its pivot point.

To ensure that the lever 18 will be moved fully down into the path of the peg 17 on the flywheel 16 so that the full depth of the lever is struck by the peg, a timing device is incorporated which comprises a D shaped projection 42 at the centre of the flywheel which coacts with a blade spring 43 attached to the free end of the lever 18.

With this arrangement the lever 18 cannot be deflected into the path of the peg 17 when the projection 42 lies under the blade spring 43 as is shown in Fig. 3, but when the peg 17 reaches the position shown in dotted lines in Fig. 3 the flat side of the projection 42 is clear of the blade spring 43 and the lever 18 can then be moved down so that it subsequently comes into the path of the peg 17.

With the lever 18 moved down and during the movement of the peg 17 from the position shown in dotted lines to that shown in full lines, the curved surface of the projection 42 will deflect the blade spring 43, and when the peg 17 contacts the lever the latter is deflected and consequently the blade spring can move back to its initial position.

Electrical current is supplied to the motor 2 and solenoid 26 through a cable 44 the leads of which are connected to a terminal post 45 secured to the casing 1 by a screwed sleeve 46, and this terminal post 45 has several leads fastened thereto which are connected to the motor brushes 47 and windings of the solenoid 26.

The motor brushes 47 are fitted in tubular housings 48 carried by an insulating block 49 Figs. 1 and 2, these blocks being positioned by an insulating strip 50 engaging a slot 51 in each side of the casing 1.

The brush assembly is held by a curved blade spring 52 which is retained by a cover plate 53 having inturned edges to engage grooves 54 formed on the casing, the top of the casing is closed by a cover plate 55.

The operation of the apparatus is as follows:
The solenoid 26 is connected in an electric circuit including a gun firing button and the motor 2 is in a separate electric circuit including an independent switch.

The motor circuit is first closed and the flywheel immediately speeds up to its full revolutions: on closing the circuit connected to the gun firing button the solenoid is energised to move the core of the solenoid whereby the link 27 will effect partial rotation of the gate 19 about its axis.

Providing that the timing device between the flywheel 16 and lever 18 is in a favourable position as previously described, the peg 17 on the face of the flywheel engages tangentially the trailing edge of the lever 18, thus moving the lever across the slot in the gate 19.

As this lever moves along the slot it is automatically pushed up into the locking slot 22 and simultaneously lifted out of the path of the peg 17 by means of the spring loaded catch pieces 23 and the lever is retained in this position so long as the solenoid circuit is closed.

The motor and flywheel continue to rotate freely while the lever is held in the locking slot in the gate.

The movement of the lever across the gate and into the locking slot causes a partial rotation of the cam 29 by virtue of the interlocking engagement of the lugs 31 on the cam with notches in the sides of the lever.

The cam 29 raises the trigger pin 37 to thereby move the sear out of engagement with the breech block of the gun and this continues to fire so long as the solenoid circuit is closed.

On release of the firing button the solenoid is deenergised and the spring 28 returns the core to the inoperative position shown in the drawings. The gate 19 is thereby rotated to the position shown in Fig. 4, the lever 18 depressing the latch 23 against the spring 24 as the lever is lifted to disengage the locking slot and shoulder 22 from the lever 18 which thereby returns to the position shown in the drawings, the return of the lever being assisted by the torsion spring 34.

During the return movement of the lever 18 the cam 29 is returned to its initial position thus releasing the trigger pin 37, and, due to the spring load exerted by the plunger 41 on the sear, the latter is moved into a position to engage and hold the breech block of the gun.

The solenoid and/or locking gate may be balanced so that the gate will not be accidentally moved during aerobatics.

It will also be appreciated that the apparatus described above introduces a further factor of safety, since the gun cannot be fired inadvertently unless the motor is running when the firing button is operated.

Whilst my invention has been more particularly described with reference to automatic gun firing mechanism it is to be understood that it may be suitably modified for remote control of other automatic machinery or apparatus.

Having described my invention, what I claim is:

1. Control mechanism for actuating a breech block releasing sear of an automatic gun which comprises an electric motor, a rotating element driven by said motor and having a projection rotating about the axis of rotation of said element, a cam mounted for movement from a normal position and comprising an arm pivoted thereon, said arm extending over the path of rotation of said projection, means arranged to move said arm in a direction transverse to the plane of movement of said projection into the path of said projection whereby said arm is engaged by said projection to move said arm and cam out of said normal position, a latch constructed and arranged to hold said arm and cam out of said normal position, and means actuated by said cam during its movement out of normal position for moving said sear.

2. Control mechanism for actuating a breech block releasing sear of an automatic gun which comprises an electric motor, a rotating element driven by said motor and having a projection rotating about the axis of rotation of said element, a cam mounted for movement from a normal position and comprising an arm pivoted thereon and extending over the path of rotation of said projection, means arranged to move said arm downwardly into the path of said projection whereby said arm is engaged by said projection to move said arm and cam out of said normal position, a latch constructed and arranged to hold said arm and said cam out of said normal position, a projection on said rotating element constructed and arranged to hold said arm from movement into the path of said rotating projection throughout a part of said path of movement and means actuated by said cam during its movement out of normal position for moving said sear.

3. Control mechanism for actuating a breech block releasing sear of an automatic gun which comprises an electric motor, a rotating element driven by said motor and having a projection rotating about the axis of rotation of said element, a cam mounted for movement from a normal position and comprising an arm pivoted thereon and extending over the path of rotation of said projection, means to move said arm downwardly into the path of said projection whereby said arm is engaged by said projection to move said arm and cam out of said normal position, releasable means to hold said arm out of normal position and means actuated by said cam during its movement out of normal position for moving said sear.

4. Control mechanism for actuating a breech block releasing sear of an automatic gun which comprises an electric motor, a rotating element driven by said motor and having a projection rotating about the axis of rotation of said element, a cam mounted for movement from a normal position and comprising an actuating arm pivoted thereon and extending over the path of rotation of said projection, means arranged to move said arm downwardly into the path of said projection, said means comprising a rocking element slidably engaging said arm, a crank arm secured to said rocking element and an electromagnet connected to said crank arm to tilt said actuating arm whereby said actuating arm is engaged by said projection to move said actuating arm and cam out of normal position, a latch constructed and arranged to hold said actuating arm and cam out of normal position and means actuated by said cam during its movement out of normal position for moving said sear.

5. Control mechanism for actuating a breech block releasing sear of an automatic gun which comprises an electric motor, a rotating element driven by said motor and having a projection rotating about the axis of rotation of said element, a pivoted actuating element for said sear having a cam and an actuating arm, said arm extending over the path of rotation of said projection, said arm being constructed and arranged to rotate said element and cam and to tilt transversely of the plane of movement of the cam, tilting means comprising an element slidably engaging said arm and having a crank arm and an electromagnet connected to said crank arm, said tilting means constructed and arranged to tilt said actuating arm axially relative to and into the path of said projection to rotate said arm and said cam by the movement of said projection and means to transmit movement from said cam to said sear actuating element and a retaining latch constructed and arranged to hold said arm from swinging back into the path of said projection.

6. Control mechanism for actuating a breech block releasing sear of an automatic gun which comprises a motor having a fly wheel and a projection extending axially therefrom at a distance from the axis of rotation of said fly wheel, a cam mounted for movement from a normal position and comprising an arm pivoted thereon, means arranged to move said arm transversely into the path of said projection and comprising a rock shaft having a sliding engagement with said arm and constructed and arranged to permit said arm to slide lengthwise thereof and rotatable to move said arm transversely into and out of the path of said projection whereby said arm is engaged by said projection to move said arm and cam out of normal position, a latch on said rock shaft constructed and arranged to hold said arm and cam out of normal position and means actuated by said cam during its movement out of normal position for moving said sear.

7. The apparatus of claim 6 and electromagnetic means for rocking said rock shaft.

8. The apparatus of claim 6 and means for preventing the movement of said arm into the orbit of said projection throughout a part of the rotation of said projection.

9. Control mechanism for actuating a breech block releasing sear of an automatic gun which comprises a rotating fly wheel having a projecting surface, a cam mounted for movement from a normal position and comprising an arm pivoted thereon, means arranged to move said arm into the path of said projecting surface, whereby said arm is engaged by said projecting surface to move said arm and cam out of said normal position, a latch constructed and arranged to hold said arm and cam out of said normal position, and means actuated by said cam during its movement out of normal position for moving said sear.

10. Control mechanism for actuating a breech block releasing sear of an automatic gun which comprises a motor, a rotating element driven about an axis of rotation by said motor, sear moving means having an actuating arm constructed and arranged to be movable in an axial direction relative to and into the path of said rotating element and movable radially by said rotating element to actuate said sear moving means and a manually releasable latch constructed and arranged to hold said arm when moved by said rotating element.

11. Control mechanism for actuating a breech block releasing sear of an automatic gun which comprises a motor, a rotating element driven about an axis of rotation by said motor, a sear moving means having an actuating arm constructed and arranged to be movable in an axial direction relative to and into the path of said rotating element and movable radially by said rotating element to actuate said sear moving means, a latch constructed and arranged to hold said arm when swung radially by said rotating element and manually controlled means to release said latch and move said arm out of the plane of rotation of said rotating element.

HENRY TREVASKIS.